(12) United States Patent
Bellamkonda et al.

(10) Patent No.: US 8,041,731 B2
(45) Date of Patent: Oct. 18, 2011

(54) EFFICIENT EVALUATION OF SQL PIVOT OPERATIONS

(75) Inventors: Srikanth Bellamkonda, Mountain View, CA (US); Lei Sheng, Redwood City, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 12/176,890

(22) Filed: Jul. 21, 2008

(65) Prior Publication Data

US 2010/0017363 A1    Jan. 21, 2010

(51) Int. Cl.
    *G06F 7/00*    (2006.01)
(52) U.S. Cl. .................................... 707/769; 707/793
(58) Field of Classification Search ............. 707/763, 707/760, 756, 755, 759, 769, 793
    See application file for complete search history.

(56) References Cited

U.S. PATENT DOCUMENTS

| | | | | |
|---|---|---|---|---|
| 6,298,342 B1 * | 10/2001 | Graefe et al. | ................ | 707/602 |
| 2005/0039114 A1 * | 2/2005 | Naimat et al. | ................ | 715/503 |

OTHER PUBLICATIONS

Conor Cunningham, Cesar A. Galindo-Legaria, Goetz Graefe; PIVOT and UNPIVOT: Optimization and Execution Strategies in an RDBMS; 2004, Porceeding of the 30th VLDB Conference, p. 998-1009.*

* cited by examiner

*Primary Examiner* — Hosain Alam
*Assistant Examiner* — Amy Ng
(74) *Attorney, Agent, or Firm* — Hickman Palermo Truong & Becker LLP (57) ABSTRACT

Techniques are described herein for supporting efficient evaluation of pivot operations. In an embodiment, a pivoting query on a data table is received. The query identifies pivot columns, measure columns, and grouping columns. In response to receiving the query, a staging table that comprises new pivot columns, aggregated columns, and new grouping columns may be created. For each particular unique combination of values of the grouping columns and the pivot columns in the data table, stored values in the measure columns in the data table are aggregated for certain rows in the plurality of rows in the data table. Each row of the certain rows comprises the each particular unique combination of values of the grouping columns and the pivot columns in the data table. Results of aggregating are stored in the staging table. Data that has been populated in the staging table is transposed into a result set.

20 Claims, 5 Drawing Sheets

104 Data Table: Sales

| PROD | QTR | AMOUNT |
|---|---|---|
| Shoes | Q1 | 2000 |
| Shoes | Q3 | 5000 |
| Shoes | Q2 | 1000 |
| Shoes | Q1 | 4000 |
| Shoes | Q4 | 2000 |
| Jeans | Q1 | 1000 |
| Jeans | Q2 | 5000 |
| Jeans | Q4 | 1000 |
| Jeans | Q2 | 1000 |

120    112    116

124 Result Set: Sales Pivoted

| PROD | Q1 | Q2 | Q3 | Q4 |
|---|---|---|---|---|
| Shoes | 6000 | 1000 | 5000 | 2000 |
| Jeans | 1000 | 6000 | Null | 1000 |

124 Result Set: Sales Pivoted

| PROD | Q1 | Q2 | Q3 | Q4 |
|---|---|---|---|---|
| Shoes | 6000 | 1000 | 5000 | 2000 |
| Jeans | 1000 | 6000 | Null | 1000 |

128

104 Data Table: Sales

| PROD | QTR | AMOUNT |
|---|---|---|
| Shoes | Q1 | 2000 |
| Shoes | Q3 | 5000 |
| Shoes | Q2 | 1000 |
| Shoes | Q1 | 4000 |
| Shoes | Q4 | 2000 |
| Jeans | Q1 | 1000 |
| Jeans | Q2 | 5000 |
| Jeans | Q4 | 1000 |
| Jeans | Q2 | 1000 |

Data Table: Sales

| PROD | QTR | AMOUNT |
|---|---|---|
| Shoes | Q1 | 2000 |
| Shoes | Q3 | 5000 |
| Shoes | Q2 | 1000 |
| Shoes | Q1 | 4000 |
| Shoes | Q4 | 2000 |
| Jeans | Q1 | 1000 |
| Jeans | Q2 | 5000 |
| Jeans | Q4 | 1000 |
| Jeans | Q2 | 1000 |

Staging Table (First Type) 202

| PROD | Q1 | Q2 | Q3 | Q4 |
|---|---|---|---|---|
| Shoes | NULL | NULL | NULL | NULL |
| Jeans | NULL | NULL | NULL | NULL |

204-1, 204-2

Result Set: Sales Pivoted

| PROD | Q1 | Q2 | Q3 | Q4 |
|---|---|---|---|---|
| Shoes | 6000 | 1000 | 5000 | 2000 |
| Jeans | 1000 | 6000 | Null | 1000 |

States of Row 204-1

| PROD | Q1 | Q2 | Q3 | Q4 | |
|---|---|---|---|---|---|
| Shoes | 2000 | NULL | NULL | NULL | ~204-1-1 |
| Shoes | 2000 | NULL | 5000 | NULL | ~204-1-2 |
| Shoes | 2000 | 1000 | 5000 | NULL | ~204-1-3 |
| Shoes | 6000 | 1000 | 5000 | NULL | ~204-1-4 |
| Shoes | 6000 | 1000 | 5000 | 1000 | ~204-1-5 |

States of Row 204-2

| PROD | Q1 | Q2 | Q3 | Q4 | |
|---|---|---|---|---|---|
| Jeans | 1000 | NULL | NULL | NULL | ~204-2-1 |
| Jeans | 1000 | 5000 | NULL | NULL | ~204-2-2 |

104 Data Table: Sales

| PROD | QTR | AMOUNT |
|---|---|---|
| Shoes | Q1 | 2000 |
| Shoes | Q3 | 5000 |
| Shoes | Q2 | 1000 |
| Shoes | Q1 | 4000 |
| Shoes | Q4 | 2000 |
| Jeans | Q1 | 1000 |
| Jeans | Q2 | 5000 |
| Jeans | Q4 | 1000 |
| Jeans | Q2 | 1000 |

Staging Table (Second Type) 302

| PROD | QTR | SUM(AMOUNT) |
|---|---|---|
| Shoes | Q1 | 6000 |
| Shoes | Q2 | 1000 |
| Shoes | Q3 | 5000 |
| Shoes | Q4 | 2000 |
| Jeans | Q1 | 1000 |
| Jeans | Q2 | 6000 |
| Jeans | Q4 | 1000 |

124 Result Set: Sales Pivoted

| PROD | Q1 | Q2 | Q3 | Q4 |
|---|---|---|---|---|
| Shoes | 6000 | 1000 | 5000 | 2000 |
| Jeans | 1000 | 6000 | Null | 1000 |

FIG. 4

EFFICIENT EVALUATION OF SQL PIVOT OPERATIONS

FIELD OF THE INVENTION

The present invention relates to databases and, more specifically, databases that support efficient evaluation of SQL pivot operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A SQL pivot operator pivots (or rotates) rows of a table into columns, performs aggregation on the measures specified, and stores the results in a result set. Pivot operations allow a user to specify multiple pivot columns in a table and multiple measures based on multiple columns of the table. Pivot operations are very useful in making and reporting comparative calculations.

Under some approaches, a user writes a pivoting query using existing SQL constructs such as group-by and aggregates. However, as the pivoting query uses existing SQL constructs as constituents, the resulting query is often too complex, even assuming the pivoting query operates correctly.

Under some other existing approaches, a user may use a new pivot operator (e.g., one or more keywords that are recognized by a database system) to cleanly and intuitively express a pivoting query. Internally, the database system still rewrites the pivoting query in terms of group-by and aggregation operations. A disadvantage of these approaches is that the rewritten (equivalent) query typically causes unnecessary data accesses and computations to underlying data.

Therefore, a better approach, which would better support efficient evaluation of SQL pivot operations, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for supporting efficient evaluation of pivot operations. In an embodiment, a pivoting query on a data table is received. The query identifies pivot columns (e.g., identified using one or more keywords such as "PIVOT . . . FOR . . . IN . . . "), measure columns (e.g., identified by one or more functions such as SUM( ), AVG( ), MAX( ), etc.), and grouping columns (e.g., any column other than the pivot columns and measure columns).

In embodiments where a first pivoting approach is used, in response to receiving the same pivoting query on the data table as mentioned above, the database system sets up a staging table of a first type that comprises one, two, or more pivot value columns, and zero or more new grouping columns. Each of the pivot value columns in the staging table corresponds to one of the plurality of possible stored values in the pivot columns in the data table. The staging table comprises one or more staging rows. This staging table may be used to pivot and aggregate data stored in the data table using a single scan of the data table. In a particular embodiment, only one corresponding staging row needs to be allocated in the staging table of the first type to store the pivoted and aggregated results of all rows in the data table that are of the same unique combination of values of the grouping columns in the data table. One advantage of this approach is that, where the values of the pivot columns in the data table are evenly distributed, only one row is needed for a unique combination of values of the grouping columns in the data table in the staging table of the first type, resulting in efficient use of memory space.

In alternative embodiments where a second pivoting approach is used, in response to receiving the query, a staging table of a second type that comprises new pivot columns, aggregated columns, and new grouping columns may be created. This staging table may be used to aggregate data stored in the data table using a single scan of the data table. In a particular embodiment, only one corresponding staging row needs to be allocated in this staging table of the second type to store the aggregated results of all rows in the data table that are of the same unique combination of values of the grouping columns and the pivot columns in the data table. Subsequently, the aggregated results in the staging table of the second type may be transposed to derive the result set that is requested by the received pivoting query. One advantage of this approach is that, where the data table comprises many rows that have the same values in the grouping columns and the pivot columns (i.e., rows clustered around these same values in the select and pivot columns, as opposed to the scenarios best handled by the first pivoting approach where rows are sparsely distributed or where rows are evenly distributed in many different values in the select and pivot columns), the number of columns and the number of rows in the staging area of the second type do not increase, resulting in efficient use of memory space.

In some embodiments, for the purpose of executing a pivoting query as mentioned, the database system may create several equivalent queries including those using the staging tables as discussed above, and select, based on one or factors (or criteria), one of several equivalent queries for execution. In a particular embodiment, one of the factors may be the size of the memory space that is to be used in such an equivalent query.

An Example Pivoting Query

Figure 1:
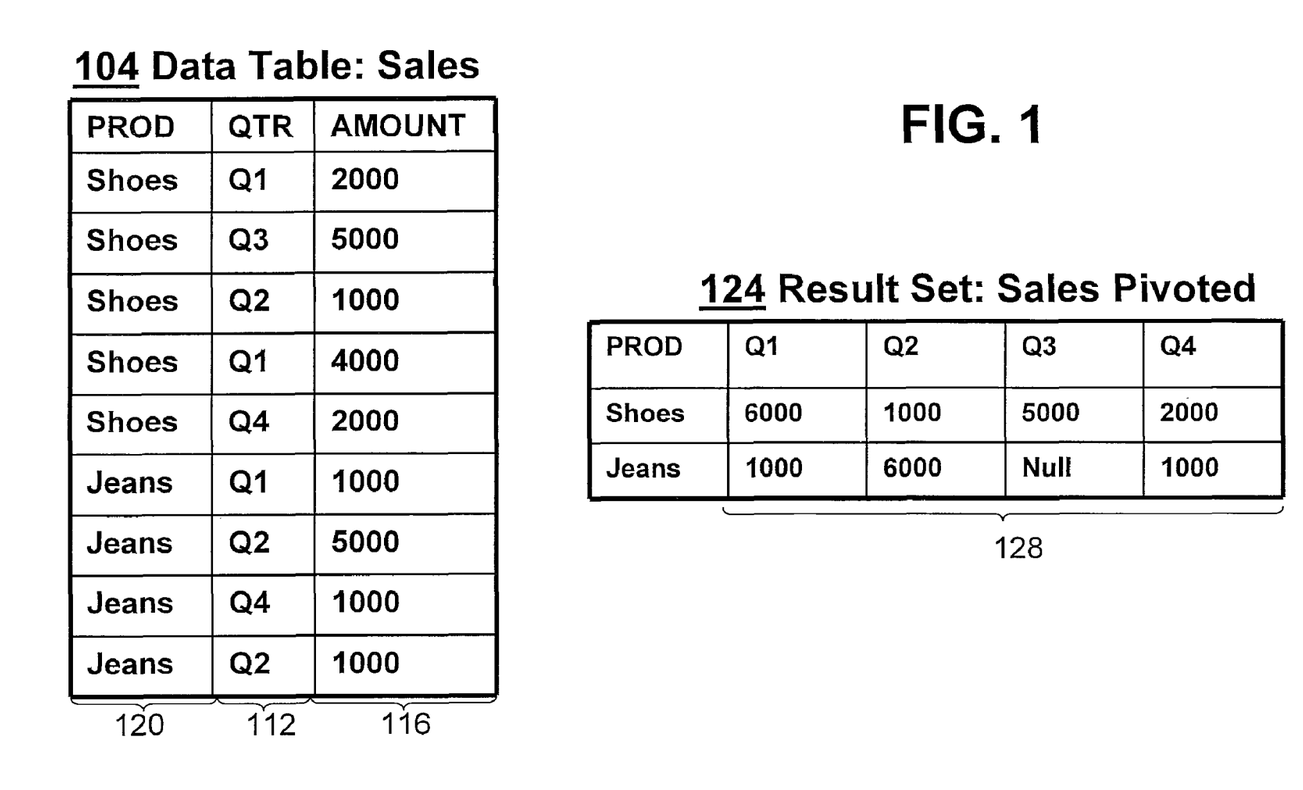
FIG. 1 illustrates an example data table and an example result set involved in an example pivoting query in an example embodiment.

FIG. 1 illustrates an example embodiment of the present invention. For the purpose of illustration, a pivoting query request that a result set 124 be produced based on a data table 104. For the purpose of illustration, the pivoting query may be expressed in a statement "S1" as follows:

```
        SELECT *                                    (S1)
        FROM Sales
            PIVOT (SUM(AMOUNT)
            FOR QTR IN ('Q1', 'Q2', 'Q3', 'Q4'));
```

Where "AMOUNT" and "QTR" are columns of a "Sales" data table, and "Q1", "Q2", "Q3", and "Q4" are possible values in the "QTR" column. The purpose of this pivoting query is to aggregate values of the "AMOUNT" columns for each of the named values of the "QTR" column, i.e., "Q1", "Q2", "Q3", and "Q4", and transpose these aggregated result in a result set 124 such that each of the aggregated values of the "AMOUNT" column is under a column that corresponds to each of the named values of the "QTR" column. For the purpose of illustration, the "Sales" data table comprises one other column, a "PROD" column, in addition to the pivot column ("QTR") and the measure column ("AMOUNT"). In accordance with an embodiment of the present invention, this "PROD" column is a grouping column.

In some embodiments, the pivoting query may involve more than one data table. In some embodiments, the pivoting query may further involve zero or more other data objects such as indexes, views, etc. In some embodiments, the pivoting query such as shown above may be a part of a large database statement. In a particular embodiment, the pivoting query may correspond to a sub-query in a large query. Alternatively, the pivoting query may correspond to one of several parts in a large query that involves joining of more than one table or view.

Expressions in a Pivoting Query

In an embodiment, the pivoting query identifies one or more columns in the data table 104 as pivot columns. For example, an expression like "PIVOT (SUM(AMOUNT) FOR Qtr IN ('Q1', 'Q2', 'Q3', 'Q4'));", where "PIVOT", "FOR" and "IN" are keywords indicating the existence of an pivot operation. Here, "AMOUNT" and "QTR" are columns of the data table 104. In this example embodiment, the pivoting query identifies the "QTR" column as a pivot column 112 (with a "FOR" keyword).

As used herein, an pivot operation refers to an operation that performs aggregate operations on as well as a rotation of the data table 104 based on possible values stored in the pivot columns. For the purpose of illustration, only one column in the data table 104 is specified as a pivot column. However, a different number of pivot columns may be specified in different embodiments.

In an embodiment, the pivoting query identifies one or more second columns in the data table 104 as measure columns. In some embodiments, the measure columns are identified using aggregation functions. As illustrated in the pivoting query "S1", an expression like "SUM(AMOUNT)", where "AMOUNT" is a column of the data table 104, identifies the "AMOUNT" column as an measure column 116. Other supported syntaxes may also be used to identify the measure columns. For instance, an expression like "MAX (PRICE)" would identifies a "PRICE" column (not shown) as an measure column 116. For the purpose of this invention, multiple measures may be specified for one column, two columns, or more columns. Likewise, multiple measure columns may be specified with one measure, two measures, or more measures.

The grouping columns may be identified in various ways. In some embodiments, the grouping columns are any columns that are neither the pivot columns nor the measure columns. For the purpose of illustration, only one column "PROD" is in the data table that is not the pivot column 112 and the measure column 116.

In some embodiments, the pivoting query may comprise further expressions that are supported by the database system.

An Example Result Set

In some embodiments, the pivoting query, when processed, returns a result set 124. In an embodiment, the result set 124 comprises one, two, or more pivot value columns 128. In some embodiments, each of the one, two, or more pivot value columns corresponds (or maps) to a unique, mutually exclusive value among possible stored values in the pivot columns 112 in the data table 104. For example, each of "Q1", "Q2", "Q3", and "Q4" constitutes a unique, mutually exclusive value among possible stored values in the "QTR" column in the data table 104.

As illustrated in the pivoting query "S1", some possible stored values in the pivot column (i.e., quarter) that the pivoting query S1 is interested in pivoting are identified (or named). For example, a list of (all) possible stored values in the quarter column may be "Q1", "Q2", "Q3", and "Q4". In this example pivoting query "S1", all of these possible stored values in the quarter column have been identified. In another embodiment, a pivoting query may not identify all the possible stored values in a pivot column such as the quarter column. For example, in a different embodiment, the pivoting query (not illustrated) may only identify "Q1" and "Q2", but not "Q3" or "Q4". In various embodiments, aggregate operations are performed for identified pivot values. In some embodiments, only named pivot values will lead to corresponding pivot value columns in the result set 124, while no columns will be created for pivot values that have not been named in the pivoting query. For example, if only the "Q1" and "Q2" are named or identified, the pivot value columns in the result set 124 may comprise "Q1" and "Q2", but not "Q3" and "Q4", as "Q3" and "Q4" are not named.

Values to be returned in the pivot value columns (128 of FIG. 1) in the result set (124 of FIG. 1) are aggregated values derived from aggregating stored values in the measure columns (116 of FIG. 1) of rows in the data table (102 of FIG. 1), wherein values of the pivot columns (112 of FIG. 1) in the rows in the data table (102) are a unique, exclusive value that corresponds to the pivot value columns (128) in the result set.

For example, the "Q1" pivot value column stores an aggregated value, i.e., 6000, derived from aggregating values in the measure column. The values of the pivot column (i.e., "Qtr") for the first and the fourth rows are both "Q1", which is a unique, exclusive value that corresponds to the "Q1" pivot value column in the "Sales Pivoted" result set 128. Thus, values of the measure column (i.e., the amount table in the "Sales" data table) in these two rows (i.e., the first and the fourth rows) are aggregated to an aggregated value of 6000, which is stored in the "Q1" pivot value column in the "Sales Pivoted" result set 128.

Pivot and Aggregate in a Combined Step

To illustrate how a staging table of a first type may be used to populate pivot value columns 128 in a result set 124 in accordance with an embodiment of the present invention, additional reference will be made to FIG. 2A and FIG. 2B, in addition to FIG. 1, in the following discussion.

For the purpose of illustration, the database system may, but is not limited to, sequentially process the data table 104. In some embodiments, when the first row in the data table 104 having a value of "Shoes" is encountered, the database system proceeds to create a new staging row 204-1 in the staging table of the first type 202. Values of the pivot value columns in the new row 204-1 may be initialized to NULL, as illustrated in FIG. 2A. The pivot value column labeled "Q1" in the staging row 204-1 is set to 2000 based on the first row, while "Q2", "Q3", and "Q4" columns in the same staging row 204-1 remain NULL. The state of the staging row 204 after the first row is processed is shown as 204-1-1 in FIG. 2B.

When the second row in the data table having a value of "Shoes" in the grouping column ("PROD") is encountered, the database system does not create a new row. Rather, it proceeds to update the existing row 204-1, resulting in a new state, i.e., 204-1-2, as illustrated in FIG. 2B. As illustrated, in this new state (i.e., 204-1-2), the pivot value column of "Q3" is updated to 5000. All other cells in the row 204-1 carry over their values in their previous state (204-1-1).

The steps as described above for creating and updating rows in the staging table of the first type 202 continue until all the rows in the data table 104 are processed.

Figure 2A:
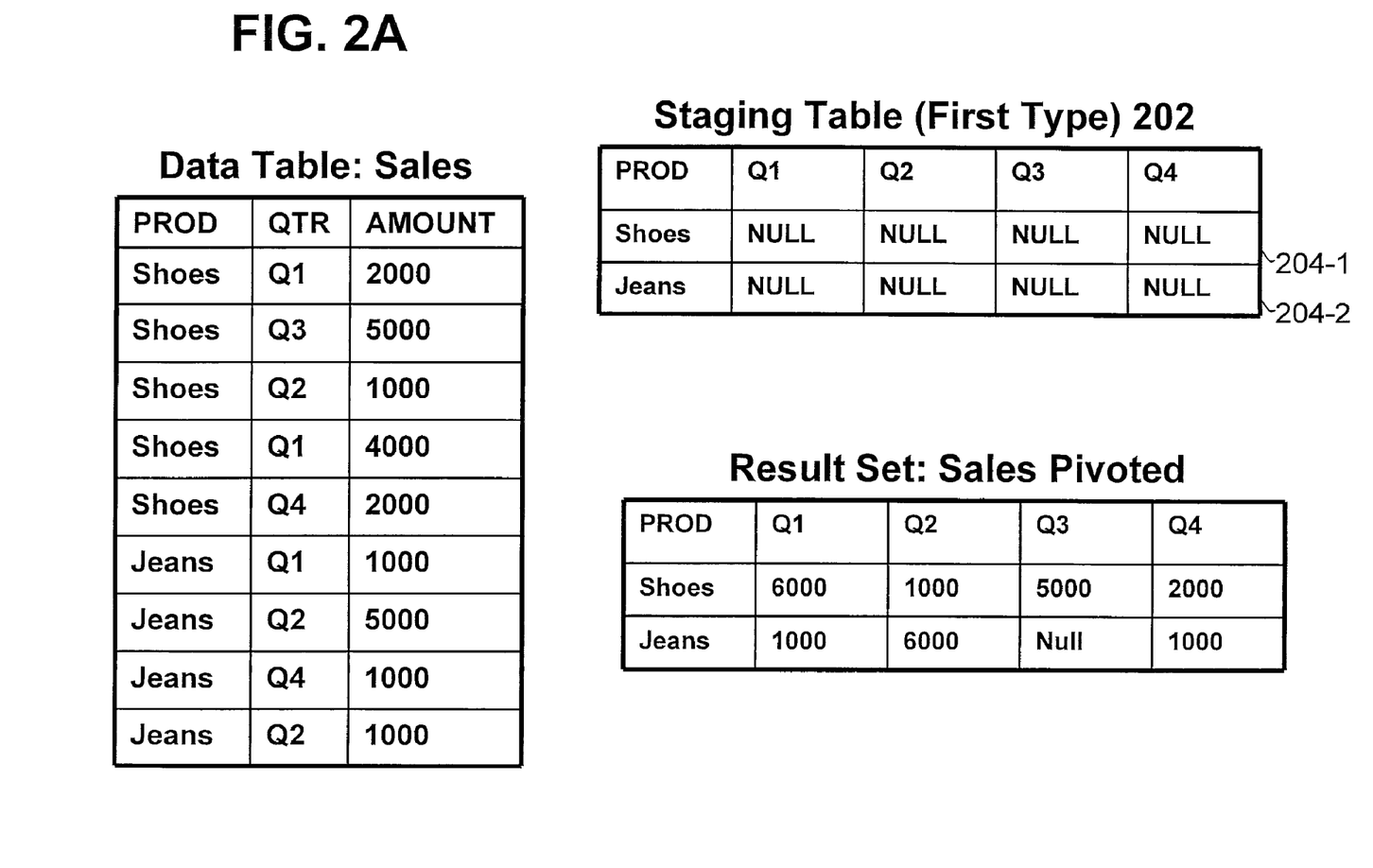
FIG. 2A and FIG. 2B illustrate use of an example staging table in an example embodiment.
Figure 2B:
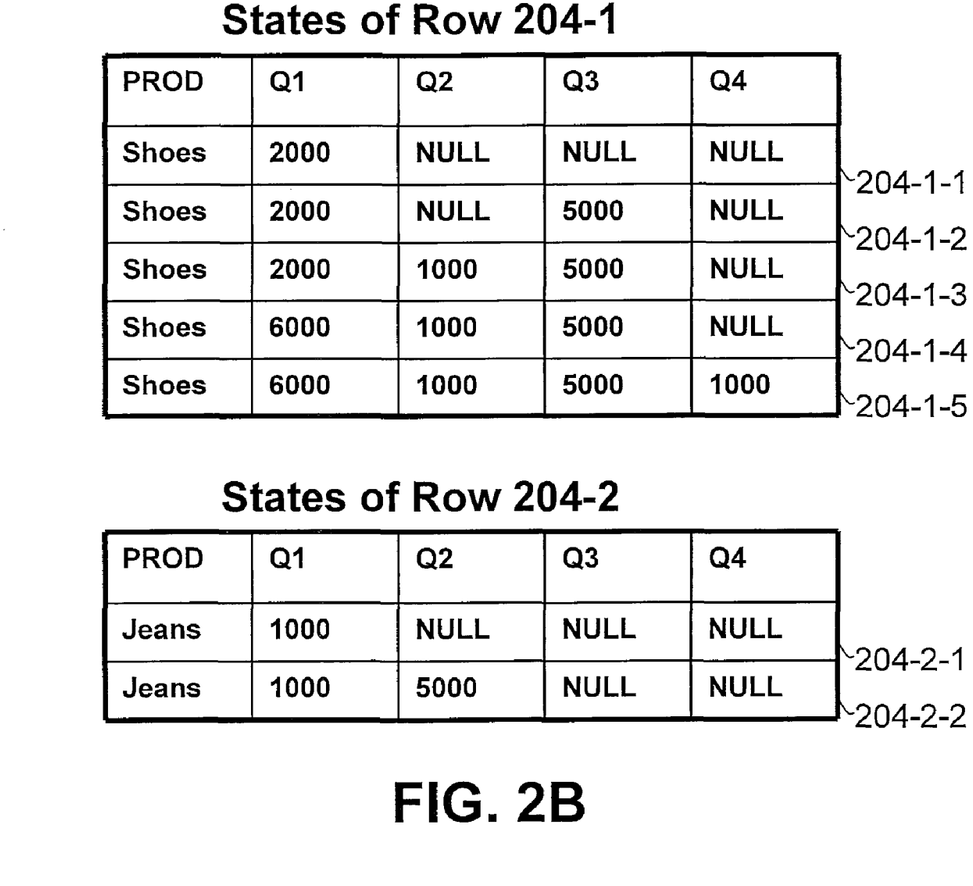

For example, as illustrated in FIG. 2A, when the sixth row in the "Sales" data table is processed, a row 204-2 is created in the staging table of the first type 202 for a new unique combination of values of the grouping columns (i.e., the product column in the present example with a value of "Jeans"). This row 204-2 that carries a value of "Jeans" may undergo a number of state changes (204-2-1 and 204-2-2 as illustrated in FIG. 2B) in a similar manner as described above in connection with the row 204-1.

Once all the rows in the data table 104, the staging table of the first type 202 may be used to populate the result set 124. Generally speaking, the result set 124 can be, but is not required to be, the same as the staging table of the first type 202. For example, the result set 124 may comprise a "SELECT" clause that specifies expressions that are derived from the grouping columns in the "Sales" data table.

In some embodiments, in response to receiving a pivoting query as described above, the database system internally converts the pivoting query to an equivalent query whose query plan, when executed, performs the steps in connection with a staging table 202 as described above. This equivalent query may be expressed in a statement "S3" as follows:

```
SELECT PROD,                              (S3)
    SUM(CASE WHEN QTR= 'Q1' THEN AMOUNT ELSE
    NULL END) "Q1",
    SUM(CASE WHEN QTR = 'Q2' THEN AMOUNT ELSE
    NULL END) "Q2",
    SUM(CASE WHEN QTR = 'Q3' THEN AMOUNT ELSE
    NULL END) "Q3",
    SUM(CASE WHEN QTR = 'Q4' THEN AMOUNT ELSE
    NULL END) "Q4"
    FROM Sales
    GROUP BY PROD;
```

For the purpose of this invention, the database system only evaluates one aggregate for each of the pivot values "Q1", "Q2", "Q3", and "Q4".

Map a Pivot Value to a Pivot Value Column

A lookup table may optionally be created to map possible pivot values of the pivot columns in the data table to the pivot value columns in the staging table as illustrated in FIG. 2A. In some embodiments, the lookup table comprises a "KEY" column and a "VALUE" column. The "KEY" column is used to store possible pivot values of the pivot columns in the data table, while the "VALUE" columns is used to store numeric values that correspond to the positions of the pivot value columns in the result set. For example, the pivot column "QTR" has a value of "Q1", "Q2", "Q3", and "Q4". The lookup table may be set up as shown in TABLE 1.

TABLE 1

| KEY | VALUE |
|-----|-------|
| Q1  | 1     |
| Q2  | 2     |
| Q3  | 3     |
| Q4  | 4     |

Note that if there are two measures specified for the "QTR" column, for example, if two measures "SUM(AMOUNT)" and "MAX(AMOUNT)" are specified for the pivot column "QTR", then, in the lookup table, a pivot value of "Q1", which is a key in the lookup table, may correspond to a tuplet value of (1, 5), wherein 1 indicates the first pivot value column in the result set and 5 indicates the fifth pivot value column in the result set.

Thus, in some embodiments, pivot value columns in the staging table may be determined using a pivot value as a key. For example, since the value 1 in the lookup table for a key "Q1" corresponds to the first pivot value column in the result set and in the staging table, the update of aggregate values in the first pivot value column (corresponding to "Q1") in the staging table of the first type can be quickly made. Similarly, if two measures (e.g., "SUM(AMOUNT)" and "MAX(AMOUNT)") are specified for aggregate operations, a tuplet value may be returned when a key such as "Q1" is looked up in the lookup table. For example, a tuplet value of (1, 5) may be returned, thereby indicating, the first and the fifth pivot value columns in the staging table should be updated with information from a corresponding row in the data table.

Pivot and Aggregate in Separate Steps

Figure 3:
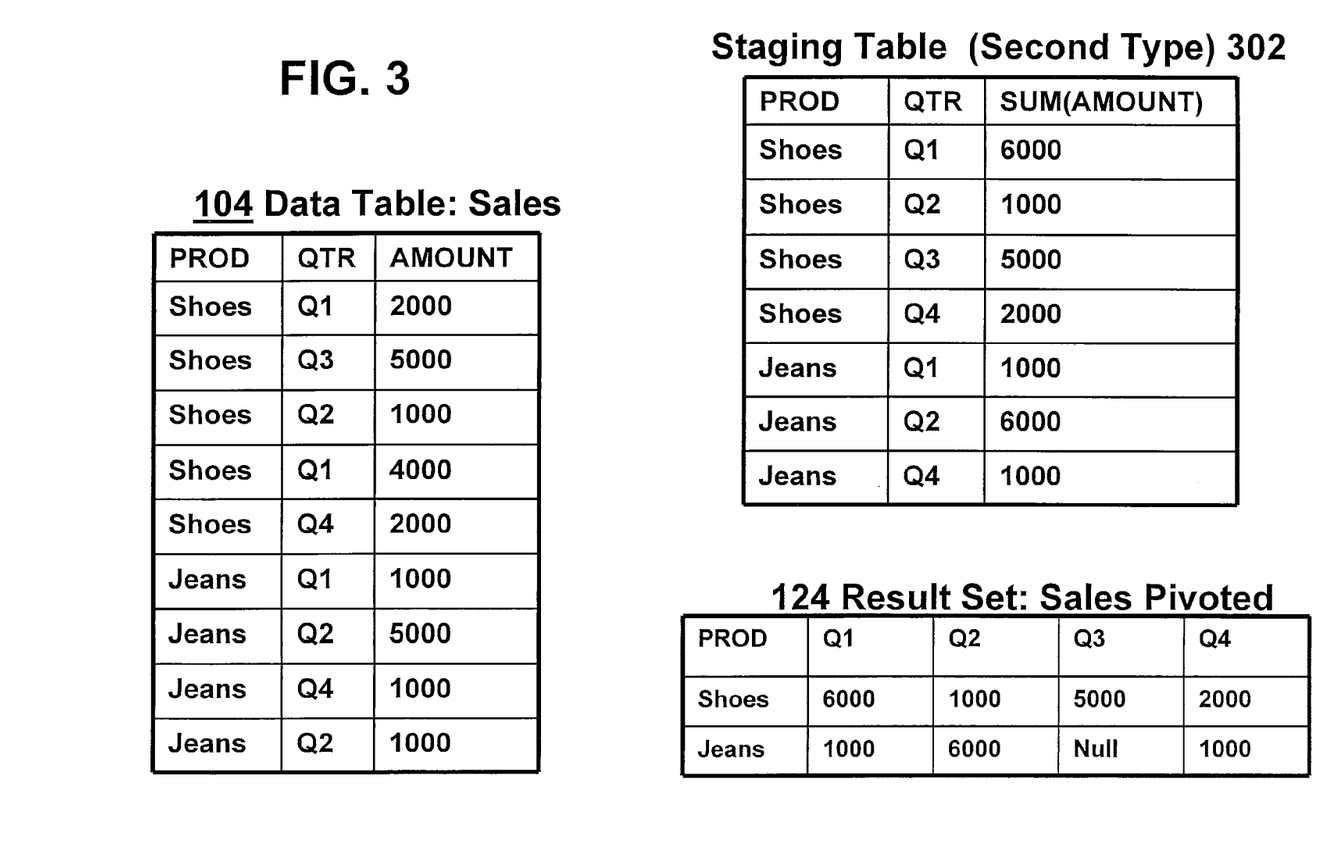
FIG. 3 illustrates use of a different example staging table in an example embodiment.

To illustrate how a staging table (of the second type) be used to populate pivot value columns (128 of FIG. 1) in a result set (128 of FIG. 1) in accordance with an embodiment of the present invention, additional reference will be made to FIG. 3, in addition to FIG. 1, in the following discussion.

Unlike the staging table of the first type, the staging table of the second type does not comprise pivot value columns. The data in the data table 104 can be aggregated without being transposed in a first step. This aggregation without transposition eventually populates the staging table of the second type, as the rows in the data table 104 are processed. Once aggregating the data in the data table 104 is finished, the database system can then perform transposing based on the staging table of the second type in a second step.

Aggregation

The aggregate operation specified in the pivoting query is then performed for each unique combination of values of the grouping columns and the pivot columns. The performance of the aggregation operation as SUM(AMOUNT) in the example pivoting query "S1" yields a value of 6000 for a unique combination of values of the pivot column (with a value of "Q1") and the product column (with a value of "Shoes"). The results of this aggregation operation are stored in a staging table of the second type 302 in FIG. 3, as the first row.

Similarly, for another unique combination of values of the product column (with a value of "Jean") and the quarter column (with a value of "Q2"), the aggregate operation specified as SUM(AMOUNT) can be performed on the $7^{th}$ and $9^{th}$ rows of the "Sales" data table 104 to give rise to the sixth row of the staging table of the second type 302.

If a set of rows for a unique combination of the grouping columns and the pivot columns (e.g., "Jeans" and "Q3") is empty, no staging row in the staging table may be created for this unique combination in an embodiment. In an alternative embodiment, a staging row with a NULL value may be created in the staging table of the second type.

After rows in the data table are processed as described above in a single scan, the staging table of the second type 302 will then be populated. The result set 124 can then be obtained by a transpose operation performed on the staging table of the second type 302.

Transposition

In this transpose operation, a row in the staging table of the second type 302 is used to populate a cell of a pivot value column that corresponds to one of the possible values of the pivot columns. For example, the first row of the staging table of the second type 302 is used to populate a cell of the "Q1" pivot value column in the "Sales Pivoted" result set, wherein the cell is in the row whose product column has a value of "Shoes". The second row of the staging table of the second type 302 is used to populate a cell of the "Q2" pivot value column in the "Sales Pivoted" result set, wherein the cell is in the row whose product column has a value of "Shoes". In this present example, both the first and the second rows of the staging table of the second type 302, as mentioned above, are used to populate the same row in the "Sales Pivoted" result set. Similarly, the fifth, the sixth, and the seventh rows of the staging table of the second type 302 are used to populate the second row in the "Sales Pivoted" result set.

Map Pivot Values to a Simple Type

In some embodiments, in response to receiving a pivoting query as described above, the database system internally converts the pivoting query to an equivalent query whose query plan, when executed, performs the steps in connection with a staging table 302 as described above. This equivalent query may be expressed in a statement "S2" as follows:

```
        SELECT PROD,                            (S2)
            SYS_OP_PIVOT(SUM(AMOUNT), 1),
            SYS_OP_PIVOT(SUM(AMOUNT), 2),
            SYS_OP_PIVOT(SUM(AMOUNT), 3),
            SYS_OP_PIVOT(SUM(AMOUNT), 4)
        FROM Sales
        GROUP BY PROD,
            case when QTR = 'Q1' then 1
                when QTR = 'Q2' then 2
                when QTR = 'Q3' then 3
                when QTR = 'Q4' then 4
            end;
```

Here, a "SYS_OP_PIVOT( . . . )" expression in the statement "S2" indicates a transposition operation based on the second argument of the "SYS_OP_PIVOT( . . . )" expression. For example, a "SYS_OP_PIVOT(SUM(AMOUNT), 2)" expression means the aggregated value goes to the second of the pivot value columns. may further comprise a "group by" clause that performs a group-by operation on the rows in the data table 104 before evaluating the rows for pivot and aggregate operations.

In the staging table of the second type 302, the database system may map possible pivot values in the data table 104 to these of a simple number type. For example, a possible value ("Q1", "Q2", "Q3", or "Q4") in the pivot column of the data table is a string. To simplify calculation, the database system maps these string values to simple numbers such as 1, 2, 3, and 4 in a row in the staging table 302. The mapping of these string values to simple numbers may be stored in a lookup table in the memory. With this mapping, a separate aggregation (as indicated by SUM(AMOUNT)) is performed for each mapped value (e.g., 1) of the pivot column ("QTR") for each combination of values of the grouping column ("PROD") and the pivot column ("QTR").

For the purpose of illustration, it has been described that only one measure such as "SUM(AMOUNT)" is specified on a pivot column such as "QTR". It should be noted that this is for illustration purposes only. For the purpose of this invention, more than one measure may be specified on a pivot column in a data table. For example, two measures "SUM (AMOUNT)" and "MAX(AMOUNT)" may be specified for the same pivot column "QTR"; correspondingly, the staging table of the second type (302) may comprise two aggregated columns, one for "SUM(AMOUNT)" while the other for "MAX(AMOUNT)".

In some embodiments, the mapped values specified in the equivalent query "S2" are used by the database system to determine where an aggregated value in the aggregated column of the staging table of the second type should be transposed. For example, the result set of FIG. 3 comprises four pivot value columns as labeled "Q1", "Q2", "Q3", and "Q4", respectively. The mapped value 1 for "Q1" in the equivalent query "S2" can be used to determine that the aggregated value in a staging row in the staging table of the second type that corresponds to "Q1" is transposed to the first column of the four pivot value columns in the result set. Similarly, the mapped value 2 for "Q2" in the equivalent query "S2" can be used to determine that the aggregated value in a staging row in the staging table of the second type that corresponds to "Q2" should be transposed to the second column of the four pivot value columns in the result set.

Evaluate Equivalent Queries

In some embodiments, the database system contains optimization logic. After receiving a pivoting query, the optimization logic creates one or more equivalent query (and/or their execution plans) such as those embodied in the statements "S1", "S2" and "S3". Based on one or more criteria (e.g., memory usage, processor usage, computation time, likelihood of data spillover to disk, etc.), the optimization logic may determine an optimal query among the equivalent queries. The optimal query may be used for the purpose executing the pivoting query.

For example, where the data table 104 comprises rows that cluster around a few unique combinations of values of grouping columns and pivot column, the optimization logic may determine that the query execution plan "S2" has the lowest cost. Alternatively, where the data table 104 comprises rows that evenly distributed among unique combinations of values of grouping columns and pivot column, the optimization logic may determine that the query execution plan "S3" has the lowest cost.

Hardware Overview

Figure 4:
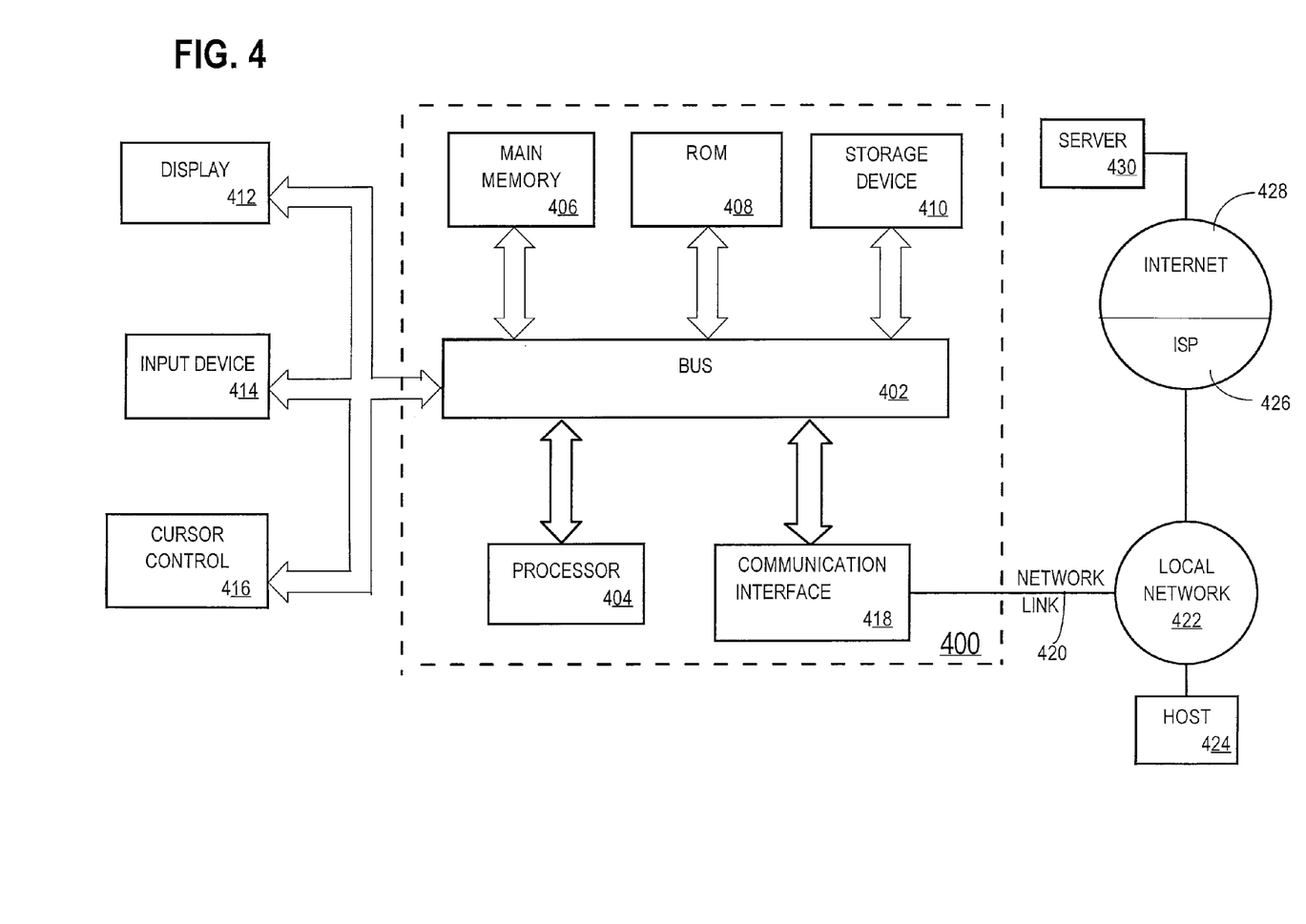
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may be used to implement the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving a pivoting query on a data table, wherein the pivoting query identifies, in the data table, one or more first columns as pivot columns, one or more second columns as measure columns, zero or more third columns as grouping columns, and one or more functions as aggregating functions;

wherein the pivoting query causes selecting a plurality of rows from the data table and outputting, based on the plurality of rows selected from the data table, a result set that comprises one or more resulting pivot value columns, each of the one or more resulting pivot value columns corresponding to a unique value among a plurality of possible stored values in the pivot columns in the data table;

in response to receiving the pivoting query on the data table:

setting up a staging table that comprises one or more staging pivot value columns, and zero or more staging grouping columns, wherein each of the one or more staging pivot value columns in the staging table corresponds to one of the plurality of possible stored values in the pivot columns in the data table, and wherein the staging table comprises one or more staging rows;

for a first particular row selected from the data table, establishing a particular staging row in the one or more staging rows in the staging table;

storing, based on stored values in the measure columns in the first particular row selected from the data table, one or more values in the staging pivot value columns for the particular staging row in the staging table;

determining that a second particular row selected from the data table corresponds to the particular staging row in the one or more staging rows in the staging table;

aggregating, using one or more of the aggregating functions, (a) one or more stored values in the measure columns in the second particular row selected from the data table and (b) the one or more values of the staging pivot value columns for the particular staging row in the staging table; and generating, based on the one or more staging rows in the staging table, the result set;

wherein the method is performed by one or more computing devices.

2. The method of claim 1, wherein each of the plurality of possible stored values in the pivot columns in the data table is represented by a tuplet.

3. The method of claim 1, wherein establishing the particular staging row in the one or more staging rows in the staging table includes identifying a row in the one or more staging rows in the staging table as the particular staging row by matching values in the staging grouping columns in the staging table with values in the grouping columns in the data table.

4. The method of claim 1, further comprising performing a group-by operation on the plurality of rows, wherein the group-by operation groups the plurality of rows based on the grouping columns.

5. The method of claim 1, wherein the step of aggregating includes looking up in a lookup table using a particular combination of values in the grouping columns and pivot columns of the particular row in the data table as a particular key and wherein a particular value in the lookup table that corresponds to the particular key in the lookup table identifies the one or more of the pivot value columns in the staging table for the particular staging row.

6. A method comprising:

receiving a pivoting query on a data table, wherein the pivoting query identifies, in the data table, one or more first columns as pivot columns, one or more second columns as measure columns, zero or more third columns as grouping columns, and one or more functions as aggregating functions;

wherein the pivoting query causes selecting a plurality of rows from the data table and outputting, based on the plurality of rows selected from the data table, a result set that comprises one or more resulting pivot value columns, each of the one or more resulting pivot value columns corresponding to a unique value among a plurality of possible stored values in the pivot columns in the data table;

in response to receiving the pivoting query on the data table:

setting up a staging table that comprises one or more staging pivot columns, one or more aggregated columns, and zero or more staging grouping columns, wherein the staging pivot columns in the staging table correspond to the pivot columns in the data table, wherein the aggregated columns in the staging table correspond to one or more measures specified on the measure columns in the data table for unique combinations of the pivot column values and the grouping column values in the data table, wherein at least one of the aggregated columns in the staging table corresponds to two or more measures specified in a measure column of the data table, and wherein the two or more measures correspond to two or more rows of the data table with the same combination of pivot column values and grouping column values, and wherein the zero or more staging grouping columns in the staging table correspond to the grouping columns in the data table;

for a first particular row selected from the data table, establishing a particular staging row in the one or more staging rows in the staging table;

storing, based on stored values in the measure columns in the first particular row selected from the data table, one or more values in the one or more aggregated columns for the particular staging row in the staging table;

determining that a second particular row selected from the data table corresponds to the particular staging row in the one or more staging rows in the staging table;

aggregating, using one or more of the aggregating functions, (a) stored values in the measure columns in the second particular row selected from the data table and (b) the one or more values of the aggregated columns for the particular staging row in the staging table; and transposing data in the staging table to derive the result set;

wherein the method is performed by one or more computing devices.

7. The method of claim 6, further comprising performing a group-by operation on the plurality of rows, wherein the group-by operation groups the plurality of rows based on the grouping columns and the pivot columns.

8. The method of claim 6, wherein the particular staging row comprises a particular unique combination of values of the grouping columns and the pivot columns in the data table and wherein the particular unique combination of values of the grouping columns and the pivot columns is a unique combination of first values of the grouping columns as represented in a first tuplet and second values of the pivot columns as represented in a second tuplet.

9. The method of claim 6, wherein the particular staging row in the staging table is initialized to additionally store, in the staging grouping columns and the staging pivot columns of the particular staging row, a particular unique combination of values of the grouping columns and the pivot columns in the data table.

10. The method of claim 6, wherein the step of aggregating include looking up in a lookup table using a particular combination of values in the grouping columns and the pivot columns of the particular row in the data table as a particular key and wherein a particular value in the lookup table that corresponds to the particular key in the lookup table identifies the particular staging row in the one or more staging rows.

11. A computer readable storage medium storing one or more sequences of instructions which, when executed by one or more processors, cause:
receiving a pivoting query on a data table, wherein the pivoting query identifies, in the data table, one or more first columns as pivot columns, one or more second columns as measure columns, zero or more third columns as grouping columns, and one or more functions as aggregating functions;
wherein the pivoting query causes selecting a plurality of rows from the data table and outputting, based on the plurality of rows selected from the data table, a result set that comprises one or more resulting pivot value columns, each of the one or more resulting pivot value columns corresponding to a unique value among a plurality of possible stored values in the pivot columns in the data table;
in response to receiving the pivoting query on the data table:
setting up a staging table that comprises one or more staging pivot value columns, and zero or more staging grouping columns, wherein each of the one or more staging pivot value columns in the staging table corresponds to one of the plurality of possible stored values in the pivot columns in the data table, and wherein the staging table comprises one or more staging rows;
for a first particular row selected from the data table, establishing a particular staging row in the one or more staging rows in the staging table;
storing, based on stored values in the measure columns in the first particular row selected from the data table, one or more values in the staging pivot value columns for the particular staging row in the staging table;
determining that a second particular row selected from the data table corresponds to the particular staging row in the one or more staging rows in the staging table;
aggregating, using one or more of the aggregating functions, (a) one or more stored values in the measure columns in the second particular row selected from the data table and (b) the one or more values of the staging pivot value columns for the particular staging row in the staging table; and
generating, based on the one or more staging rows in the staging table, the result set.

12. The medium of claim 11, wherein each of the plurality of possible stored values in the pivot columns in the data table is represented by a tuplet.

13. The medium of claim 11, wherein the instructions for establishing the particular staging row in the one or more staging rows in the staging table includes instructions for identifying a row in the one or more staging rows in the staging table as the particular staging row by matching values in the staging grouping columns in the staging table with values in the grouping columns in the data table.

14. The medium of claim 11, wherein the instructions for establishing a particular staging row in the one or more staging rows in the staging table includes instructions for performing a group-by operation on the plurality of rows, wherein the group-by operation groups the plurality of rows based on the grouping columns.

15. The medium of claim 11, wherein the instructions for aggregating includes instructions for looking up in a lookup table using a particular combination of values in the grouping columns and pivot columns of the particular row in the data table as a particular key and wherein a particular value in the lookup table that corresponds to the particular key in the lookup table identifies the one or more of the pivot value columns in the staging table for the particular staging row.

16. A computer readable storage medium storing one or more sequences of instructions which, when executed by one or more processors, cause:
receiving a pivoting query on a data table, wherein the pivoting query identifies, in the data table, one or more first columns as pivot columns, one or more second columns as measure columns, zero or more third columns as grouping columns, and one or more functions as aggregating functions;
wherein the pivoting query causes selecting a plurality of rows from the data table and outputting, based on the plurality of rows selected from the data table, a result set that comprises one or more resulting pivot value columns, each of the one or more resulting pivot value columns corresponding to a unique value among a plurality of possible stored values in the pivot columns in the data table;
in response to receiving the pivoting query on the data table:
setting up a staging table that comprises one or more staging pivot columns, one or more aggregated columns, and zero or more staging grouping columns, wherein the staging pivot columns in the staging table correspond to the pivot columns in the data table, wherein the aggregated columns in the staging table correspond to one or more measures specified on the measure columns in the data table for unique combinations of the pivot column values and the grouping column values in the data table, wherein at least one of the aggregated columns in the staging table corresponds to two or more measures specified in a measure column of the data table, and wherein the two or more measures correspond to two or more rows of the data table with the same combination of pivot column values and grouping column values, and wherein the zero or more staging grouping columns in the staging table correspond to the grouping columns in the data table;

for a first particular row selected from the data table, establishing a particular staging row in the one or more staging rows in the staging table;

storing, based on stored values in the measure columns in the first particular row selected from the data table, one or more values in the one or more aggregated columns for the particular staging row in the staging table;

determining that a second particular row selected from the data table corresponds to the particular staging row in the one or more staging rows in the staging table;

aggregating, using one or more of the aggregating functions, (a) stored values in the measure columns in the second particular row selected from the data table and (b) one or more values of the aggregated columns for the particular staging row in the staging table; and transposing data in the staging table to derive the result set.

17. The medium of claim 16, wherein the one or more sequences of instructions further comprise instructions, when executed by one or more processors, cause:

performing a group-by operation on the plurality of rows, wherein the group-by operation orders the plurality of rows based on the grouping columns and the pivot columns.

18. The medium of claim 16, wherein the particular staging row comprises a particular unique combination of values of the grouping columns and the pivot columns in the data table and wherein the particular unique combination of values of the grouping columns and the pivot columns is a unique combination of first values of the grouping columns as represented in a first tuplet and second values of the pivot columns as represented in a second tuplet.

19. The medium of claim 16, wherein the particular staging row in the staging table is initialized to additionally store, in the staging grouping columns and the staging pivot columns of the particular row, a particular unique combination of values of the grouping columns and the pivot columns in the data table.

20. The medium of claim 16, wherein the instructions for aggregating include looking up in a lookup table using a particular combination of values in the grouping columns and the pivot columns of the particular row in the data table as a particular key and wherein a particular value in the lookup table that corresponds to the particular key in the lookup table identifies the particular staging row in the one or more staging rows.

* * * * *

UNITED STATES PATENT AND TRADEMARK OFFICE
CERTIFICATE OF CORRECTION

| | | |
|---|---|---|
| PATENT NO. | : 8,041,731 B2 | Page 1 of 1 |
| APPLICATION NO. | : 12/176890 | |
| DATED | : October 18, 2011 | |
| INVENTOR(S) | : Bellamkonda et al. | |

It is certified that error appears in the above-identified patent and that said Letters Patent is hereby corrected as shown below:

On Title page, Item [56] in column 2, under "Other Publications", line 3, delete "Porceeding" and insert -- Proceeding --, therefor.

Signed and Sealed this
Third Day of January, 2012

David J. Kappos
*Director of the United States Patent and Trademark Office*